Oct. 29, 1957     G. SMITH     2,811,674

STATIC WIRE DEVICE

Filed May 6, 1954

INVENTOR
GLEN SMITH

BY

*J. J. Schmitt*
ATTORNEY

United States Patent Office 2,811,674
Patented Oct. 29, 1957

2,811,674

STATIC WIRE DEVICE

Glen Smith, Corpus Christi, Tex.

Application May 6, 1954, Serial No. 428,144

4 Claims. (Cl. 317—2)

(Granted under Title 35, U. S. Code (1952), sec. 266)

The invention described herein may be manufactured and used by or for the Government of the United States of America for governmental purposes without the payment of any royalties thereon or therefor.

The present invention relates to a static wire device and more particularly to a static wire device employing a spring means to allow stretching of the device without breaking, the device also having novel connector means which permits rapid and safe insertion within a suitable fluid conduit means.

The device is primarily intended for use in flexible fluid conduits which are utilized to transfer flammable fluids such as gasoline or the like. Such conduits are usually in the form of a hose composed of fiber or plastic and similar materials. As is well-known in the art, the flow of fluid through a hose generates static electric charges which tend to accumulate on the nozzle of the hose and if allowed to collect cause a serious fire hazard in that the electric charges may cause a spark which will ignite the flammable fluid passing through the hose and the attendant fumes adjacent to the nozzle. Accordingly, static wires are generally secured between the metallic fittings at opposite ends of the hose to connect the nozzle to ground in order to prevent static electric charges from collecting on the nozzle.

Static wires have been connected to the exterior of the metallic fittings of the hose and wrapped around the outer periphery of the hose, but in such cases the wire is subject to excessive wear and is likely to be broken by snagging on protruding surfaces. Accordingly, static wires are generally connected to the interior of the hose fittings and are positioned within the hose. The wires of prior art devices are soldered to the interior of the fittings and are provided with sufficient slack to allow for stretching of the hose.

The slack existing in the wire of known devices is disadvantageous because when the hose is partially reeled in, the loop of the slack wire occasionally becomes positioned about a portion of the internal nozzle mechanism, and upon unreeling of the hose, the wire is caught in the nozzle, and one of the soldered ends thereof is pulled away from the associated hose fitting. The use of soldered connections is also unsatisfactory due to the fact that when it is desired to install a static wire in the field where flammable fumes are present, soldering may not be feasible due to the fire hazard created by the use of a soldering iron.

The present invention employs a spring means to take up slack in the wire and prevent the possibility of the wire becoming caught within the nozzle. Mechanical connectors are also utilized in the invention device to connect the device to the hose fittings thereby eliminating the necessity of soldered connections and permitting installation of the device even when flammable fumes are present.

An object of the present invention is the provision of a new and novel static wire device having a means for automatically taking up all slack in the device.

Another object is to provide a new and novel static wire device employing connector means which may be easily and quickly installed even when flammable fumes are present.

A further object of the invention is the provision of a new and novel static wire device which is simple and inexpensive in construction, yet sturdy and reliable in operation.

Other objects and many of the attendant advantages of this invention will be readily appreciated as the same becomes better understood by reference to the following detailed description when considered in connection with the accompanying drawings wherein.

Figure 1:
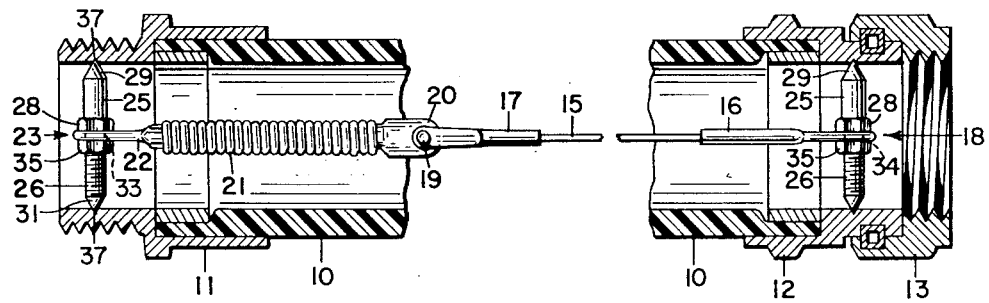
Fig. 1 is a longitudinal sectional view of a fluid conducting hose showing the invention device in operative position.

Referring now to the drawings wherein like reference characters designate like or corresponding parts throughout the several views, there is shown in Fig. 1 a conventional fluid conducting hose 10 formed of fiber, plastic or other suitable flexible material. Metallic fittings 11 and 12, formed of bronze or the like, are fixed to opposite end portions of the hose in a well known manner, fitting 11 being suitably adapted to receive a nozzle, and fitting 12 having a rotatable portion 13 connected thereto, said rotatable portion being adapted to be connected to a tank or other source of fluid in a conventional manner.

A flexible metallic static wire 15 formed of Phosphor bronze or the like has fittings 16, 17 suitably connected to the opposite ends thereof as by swaging. Fitting 16 is secured to connector means 18 which will be hereinafter more fully described, and fitting 17 is secured as by a rivet 19 to a flattened end portion of attaching member 20, the opposite end of member 20 being cylindrical in configuration and fitting within a tension spring 21, the outer periphery of said cylindrical portion being attached to the inner periphery of spring 21 as by soldering or the like. A member 22 identical with member 20 is similarly attached to the opposite end portion of spring 21 and the flattened end portion of member 22 is secured to a connector means 23 which is identical with connector means 18.

Since the connector means are identical in construction and operation, similar parts thereof have been given the same reference numeral and a single description will suffice for both connector means. Each of the connector means comprises a female member 25 and a male member 26, member 25 having a longitudinal passage 27 formed therein with screw threads formed on the inner periphery thereof. A multi-sided flange 28 is provided on one end portion of member 25, the opposite end portion 29 being tapered to a point. Member 26 has screw threads 30 formed on the outer periphery thereof, and end portion 31 is tapered to a point. Member 26 is threaded within passage 27 when in operative position as seen in Fig. 1. Member 26 of one connector means passes through an opening 33 provided in member 22, and member 26 of the other connector means passes through an opening 34 formed in an end portion of member 16. Jam nuts 35 are threaded on members 26 to rigidly secure members 22 and 16 to the respective connector members.

Figure 2:
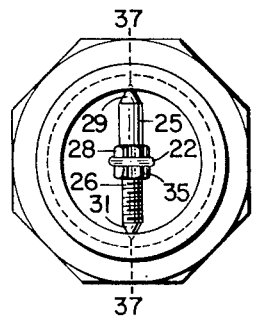
Fig. 2 is an end view of the assembly shown in Fig. 1.
Figure 4:
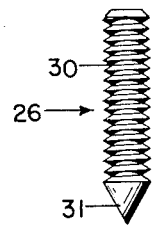
Fig. 4 is an enlarged view of another component of the invention device.
Figure 3:
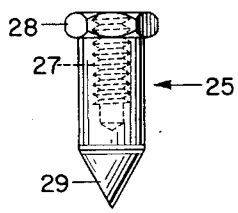
Fig. 3 is an enlarged view of one of the components of the invention device.

The inner peripheries of fittings 11 and 12 are provided with conical seats 37, and as most clearly seen in Fig. 2, these seats are formed in diametrically opposite portions of the fittings. The tips of pointed ends 29 and 31 of each of the connector means are adapted to be positioned within an opposite pair of seats 37 formed in each of the fittings 11 and 12, and it is apparent that by rotating member 25 with respect to member 26, end portions 29, 31 may be expanded into operative position as seen in Figs. 1 and 2.

It is apparent that when it is desired to install the invention device within a hose it is merely necessary to punch seats 37 within the inner periphery of the hose fittings, whereupon the invention device may be inserted within the hose and the connector means urged into operative position by rotating member 25 with respect to member 26, utilizing multi-sided flange 28 for this purpose.

The length of the wire 15 is dependent upon the length of the hose, and the wire is proportioned such that spring 21 is under tension when the device is installed within a hose whereby the spring will compensate for any slack which may occur in wire 15 when the hose is rolled up.

It is evident from the foregoing that there is provided a new and novel static wire device having a means for taking up all slack therein, and providing a connector means which may be quickly and easily installed even when flammable fluids are present. The device is simple and inexpensive in operation, yet sturdy and reliable in operation.

Obviously many modifications and variations of the present invention are possible in the light of the above teachings. It is therefore to be understood that within the scope of the appended claims the invention may be practiced otherwise than as specifically described.

I claim:

1. In combination, an elongated hollow fluid conduit means having metallic fittings secured to the opposite ends thereof, recessed seats formed in diametrically opposite portions of the inner periphery of each of said fittings, a metallic wire positioned within said conduit means and having one end thereof secured to a first connector means, the opposite end of said wire being secured to one end of a tension spring means, the opposite end of said spring means being secured to a second connector means, each of said connector means comprising two members having cooperating screw threads formed thereon and being in engagement with one another, one end of each of said members being tapered, the tapered ends of each connector means being positioned within the opposite seats formed in one of said fittings.

2. In combination, an elongated hollow fluid conduit means having metallic fittings secured to the opposite ends thereof, recessed seats formed in diametrically opposite portions of the inner periphery of each of said fittings, a flexible wire having one end thereof secured to a first connector means, the opposite end of said wire being secured to one end of a tension spring means, the opposite end of said spring means being secured to a second connector means, each of said connector means comprising first and second members, said first member having a passage formed longitudinally therein, screw threads formed on the inner periphery of said passage, one end of said first member being tapered, said second member having screw threads formed on the outer periphery thereof, one end of said second member being tapered, said screw threads being in engagement with one another, and said tapered end portions of each of said connector means being positioned within the opposite seats formed in one of said fittings.

3. A safety device for preventing the accumulation of static electricity on apparatus utilized for the transfer of flammable fluids, said apparatus including a flexible conduit of nonconducting material provided with a metallic fitting of generally tubular configuration on each end thereof, said safety device comprising an elongated electrical conductor carried within said conduit with its ends respectively fastened to the said metallic fittings by a pair of detachable connectors, each of said connectors including a pair of threaded telescoping pins positioned within one of the fittings so as to extend radially thereof, the over-all length of each pair of telescoping pins being manually adjustable through a relative rotation of its individual threaded components, whereby each pair of pins may be selectively extended so that the extremities thereof contact the inner wall of the fitting to thus hold said electrical conductor in place within the said conduit regardless of any flexing to which the latter may be subjected during the transfer of said flammable fluids.

4. A safety device according to claim 3, in which each of the said tubular fittings is provided with a pair of diametrically-opposed recesses in the inner wall thereof, and in which each pin of the pair carried within such fitting is formed with an extremity configured to fit within one of the said recesses.

References Cited in the file of this patent

UNITED STATES PATENTS

| | | |
|---|---|---|
| 900,830 | Chapman | Oct. 13, 1908 |
| 1,093,491 | Smith | Apr. 14, 1914 |
| 1,988,816 | Smith | Jan. 22, 1935 |
| 2,027,743 | Merkel | Jan. 14, 1936 |
| 2,103,758 | Seyfried | Dec. 28, 1937 |
| 2,531,308 | Thomas | Nov. 21, 1950 |
| 2,689,944 | Curtis | Sept. 21, 1954 |
| 2,712,098 | Legge | June 28, 1955 |
| 2,714,181 | Azbill | July 26, 1955 |

FOREIGN PATENTS

| | | |
|---|---|---|
| 1,003,609 | France | Nov. 21, 1951 |